United States Patent [19]

Condolios et al.

[11] 4,347,140
[45] Aug. 31, 1982

[54] INSTALLATION FOR AND A METHOD OF SPREADING CLAYEY MUD AND RECLAIMING LAND

[75] Inventors: Elie Condolios; Pierre Couratin, both of Grenoble, France

[73] Assignee: Alsthom-Atlantique, Paris, France

[21] Appl. No.: 224,761

[22] Filed: Jan. 13, 1981

[51] Int. Cl.³ .............................................. C02F 1/54
[52] U.S. Cl. .................................. 210/710; 210/712; 210/747; 210/195.1; 210/901; 405/129; 405/264
[58] Field of Search ............... 210/800, 803, 804, 805, 210/710, 712, 901, 170, 747, 768, 772, 770, 195.1, 197; 405/263, 264, 129

[56] References Cited

U.S. PATENT DOCUMENTS

| | | | |
|---|---|---|---|
| 3,680,698 | 8/1972 | Liu et al. ............................. | 210/714 |
| 3,684,092 | 8/1972 | Busse et al. ......................... | 210/768 |
| 3,763,041 | 10/1973 | Cook et al. .......................... | 210/714 |
| 3,931,006 | 1/1976 | Baillie et al. ........................ | 210/800 |
| 4,008,146 | 2/1977 | Bain et al. ........................... | 210/803 |
| 4,252,462 | 2/1981 | Klingle et al. ....................... | 210/170 |
| 4,289,540 | 9/1981 | Yong et al. .......................... | 210/729 |

*Primary Examiner*—Benoit Castel
*Attorney, Agent, or Firm*—Sughrue, Mion, Zinn, MacPeak & Seas

[57] ABSTRACT

An installation for spreading clayey mud on ground which is free from water and which is prepared to receive the mud by laying a filtering bottom above the level of ground water, said installation comprising a decanting tank in which a mixture of mud and flocculating agent settles, a mud extraction pump for extracting said settled mixture of mud and flocculating agent from the decanting tank and pushing it into a pipe to convey said mixture up to at least one high mud pouring point located above said prepared ground, said installation further comprising means for adding more flocculating agent to said mixture in the vicinity of said mud pouring point.

4 Claims, 4 Drawing Figures

INSTALLATION FOR AND A METHOD OF SPREADING CLAYEY MUD AND RECLAIMING LAND

The present invention relates to an installation for spreading argilaceous (i.e. clayey) mud.

BACKGROUND OF THE INVENTION

Among other applications, the invention applies to the phosphate mines of Florida in which the ore extracted from mine cuts is separated in a washing plant into 3 components: a concentrated phosphate, a siliceous sand, clay earths (montmorillonites and attapulgites).

Currently, one washing plant delivers 2,000,000 tons of clay per year, contained in 50,000,000 m$^3$ of clayey water.

The volumes are discharged at considerable rates into reservoirs covering several km$^2$ where natural decanting takes place. The reservoirs are provided with embankments which rise about 15 m above the original ground level. They are gradually abandoned full of viscous mud at 25% concentration. This solution is undesirable and the public authorities have published new regulations requiring all mined surfaces to be returned to their former state with the same flora and fauna and prohibiting, in particular, said mud reservoirs. These reservoirs also constitute a danger the event of their embankments breaking.

The present invention therefore aims to provide an installation for spreading clayey mud with a view to its subsequent dehydration and solidification on terrain which returns to a useable condition.

SUMMARY OF THE INVENTION

The invention therefore provides an installation for spreading clayey mud on ground which is free from water and which is prepared to receive the mud by laying a filtering bottom above the level of ground water, said installation comprising a decanting tank in which a mixture of mud and flocculating agent settles, a mud extraction pump for extracting said settled mixture of mud and flocculating agent from the decanting tank and pushing it into a pipe to convey said mixture to at least one high mud pouring point located above said prepared ground, said installation further comprising means for adding more flocculating agent to said mixture in the vicinity of said mud pouring point.

In one preferred embodiment of the invention, said extra flocculating agent in the vicinity of the mud pouring point(s) is added at two points upstream therefrom, said points being spaced a few meters apart, the flocculating agent being injected into said pipe at a first, more upstream, point after being diluted with part of the water drained off from the spread mud, additional flocculating agent also being injected into said pipe (whether diluted or not) at a second, more downstream, point.

In another preferred embodiment, the spreading area lies between at least one upstream embankment and one downstream embankment, at least the downstream embankment being porous, the upstream embankment constituting said upper point and including a pipe provided with a plurality of successive discharge points, said spreading area further being slightly inclined parallel to said embankments.

The present invention also provides a method of spreading clayey and reclaiming mud as performed by said installation.

In the present specification and claims, the word "embankment" must be understood to include both embankments built up specially and embankments resulting from a mine being cut. This is the case, in particular, in phosphate mines in Florida.

DETAILED DESCRIPTION

Figure 1:
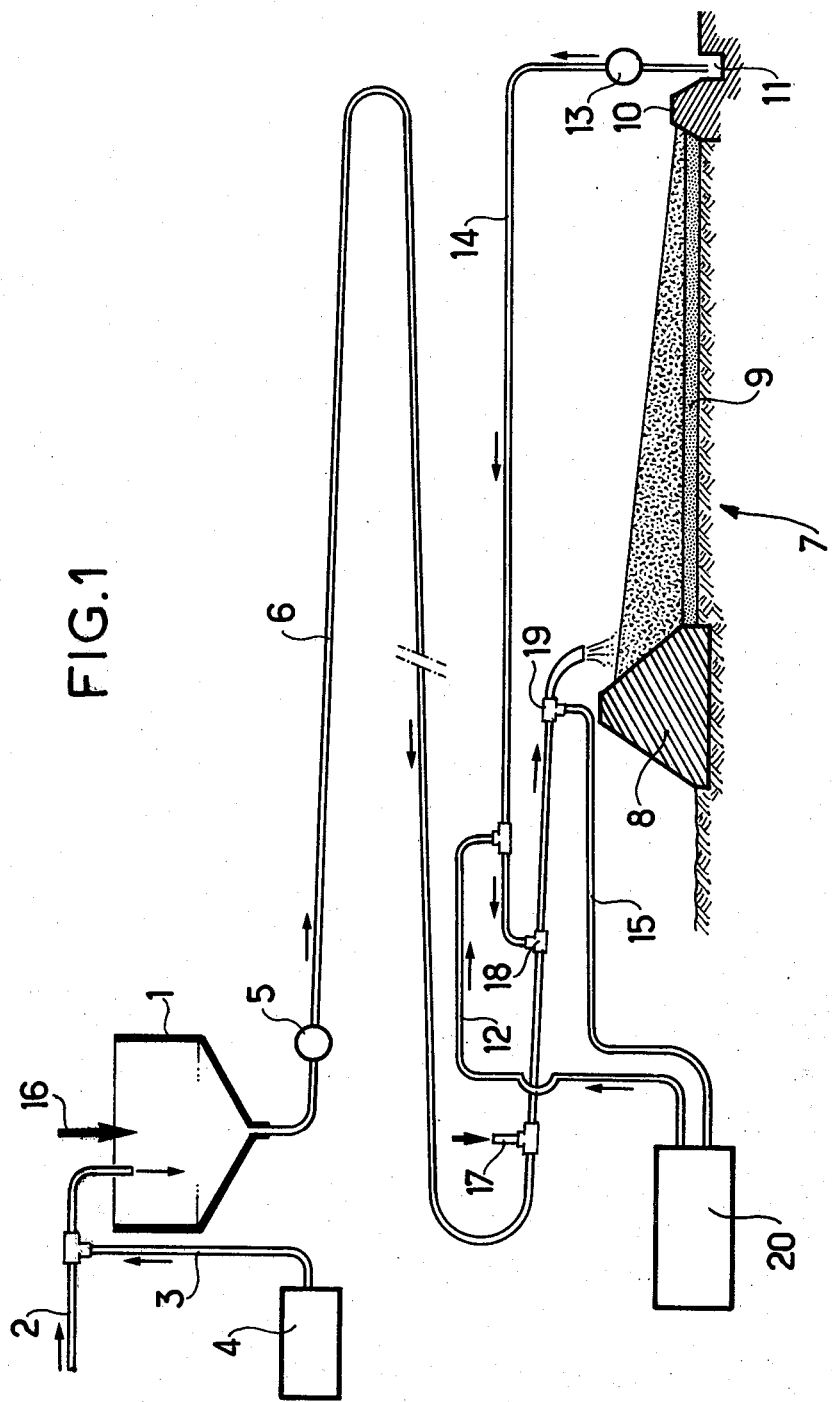
FIG. 1 is a partial schematic and vertical sectional view which illustrates a spreading installation in accordance with the invention.

The installation includes a decanter-clarifier 1. Muddy water coming from a washing plant in which phosphate ore is treated is brought into the decanter 1 via a pipe 2. The muddy water contains clay rejected from the washing plant at an average concentration of 4%. A flocculating agent e.g. a polyacrylamide, is added to the muddy water via a pipe 3 coming from a storage tank 4 just before it enters the decanter. The quantity of flocculating agent injected is, for example, 350 grammes per (metric) ton of dry mud.

A pump 5 removes the thickened mud from the base of the decanter 1 which is then at a concentration of 10% to 13% and pushes it through a pipe 6 which ends above a previously prepared spreading area 7. This area must be dried of all water and its bottom must provide a filter located above the level of ground water. The place of extraction may be used as the spreading area providing that it is dried of all water either by making an embankment from the ground of the discovered area together with floatation sand or by lowering the ground water level by pumping. In any case, a filtering bottom must be set in position above the water level. Floatation sand is especially recommended for this use, and may be spread in a layer 9 that is, for example, 1 m thick. An embankment 8 is built 15 to 20 m high, for example, to form the highest decanting point. Before spreading the layer 9, the ground should have a slope of 1 in 100 or less. A low filtering embankment 10 is placed at the far end of the field, e.g. at 200 m from the decanting point and there is a water removal gutter 11 beyond the embankment.

The spreading area may be either rectangular or circular. If it is circular, a central pylon supports the mud inlet pipe 6.

In the neighbourhood of the outlet of the pipe 6, the floccules broken during transport are restored to their former mechanical structure by superflocculation. To do this, at a few tens of meters from the end of the pipe 6, a first dose of flocculating agent stored in a tank 20 is added via a unit 18 through a pipe 12 and is diluted with water collected from the gutter 11 and transported by a pump 13 and a pipe 14; a second dose of flocculating agent arrives via a pipe 15 and is injected by a unit 19 near the end of the pipe 6.

This way of operating ensures proper mixing of the flocculating agent with the preconcentrated mud and it makes it possible to save on the amount of flocculating agent required for final dehydration.

Also, to improve the quality of the ground deposited by spreading, sand can be added thereto. For example, this can be done at two points of the installation: at the decanter 1, as shown by arrow 16 and at the end of the pipe at 17, before injection of the first diluted dose of flocculating agent.

The spreading operation is then carried out naturally, the spread material forming a slope of about 1 in 10. This slope allows the mud to flow slowly and the water given off by super-flocculation to be removed easily. The water flows out due to the slope and is easily removed into the ground water. After a relatively short time, ground containing 30% of solid material is obtained, the surface of the ground being crackled and thereby facilitating evaporation. After a few months, the ground is consolidated.

The distance which lies between units 18 and 19 and separates the point of injection of the first dose of flocculating agent from the point of injection of the second dose is preferably at least equal to 10 meters, and the mixing can be improved by providing the pipes with one or more bends between the two units 18 and 19. For superflocculation, about 650 grammes of flocculating agent per metric ton of dry mud are added at points 18 and 19. For Florida clay, this brings the total weight of the flocculating agent up to 650+350 grammes, i.e. 1 kg per metric ton. By way of example it may be said that the flow rate of water recirculated in the pipe 14 is about 40% of that in the pipe 6.

Figure 2:
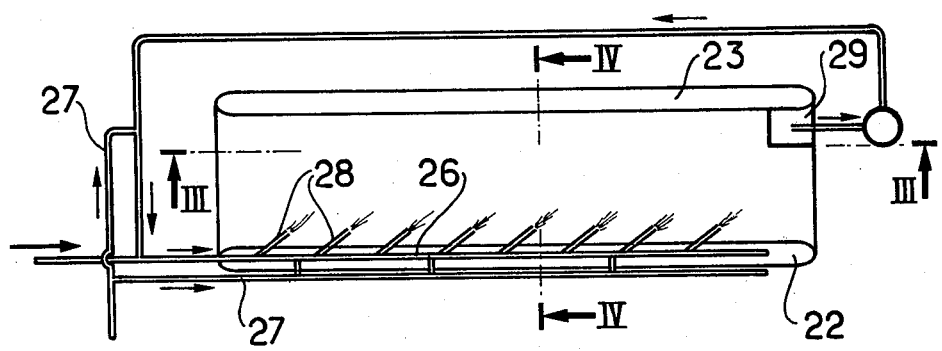
FIG. 2 is a top view of a particular configuration of a spreading area which can be applied e.g. to mines in Florida.
Figure 3:
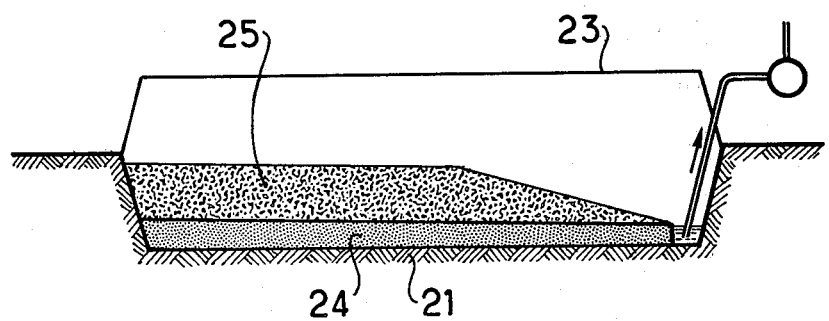
FIG. 3 is a cross-section along III—III of FIG. 2.
Figure 4:
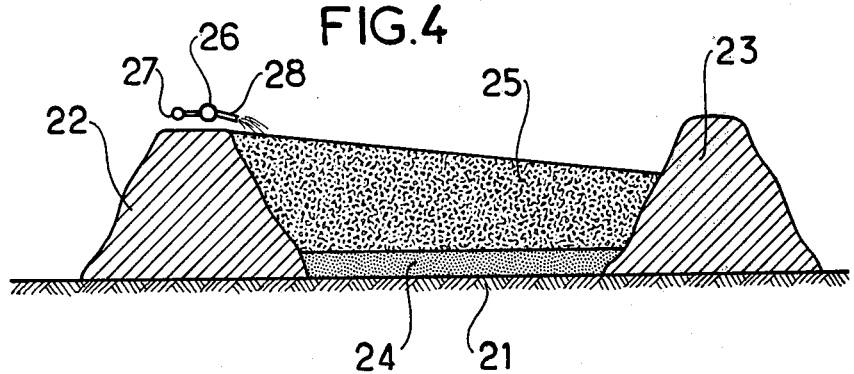
FIG. 4 is a cross-section along IV—IV of FIG. 2.

With reference to FIGS. 2,3 and 4, a description will be given of a spreading area in which it is intended to decant the mud for consolidation. This area lies in the cavity left by surface mining using an excavator.

The bottom of the mine is constituted by the original ground 21 which was directly beneath the extracted phosphate layer. Said original ground generally lies below the level of the ground water. Each mine is delimited by two lines of mounds 22, 23, built up from the sandy ground which was situated above the phosphate layer before working the mine. Adding a layer of sand 24 which comes from the washing plant or from said sandy ground provides a suitable spreading area with a permeable bottom. Pumping ensures that this area is above the level of the ground water between two lines of embankments which are themselves porous and are formed by mounds 22 and 23. The decanted mud is illustrated at 25.

The top of the mound 22 is levelled and supports a system of mud pipes 26 and of flocculating pipes 27. From one mound 22 to the other 23, the mud assumes a natural slope of about 1 in 10.

A series of successive discharge points 28 is spaced out along the mound 22 so that in longitudinal cross-section it slopes much less i.e. at about 1 in 100. Pumping point 29 for pumping the water which is to be recirculated is located downstream from the mine. The pumping point 29 receives part of its water by surface flow on the deposit of mud and another part of said water by infiltration into ground water.

We claim:

1. An installation for spreading clayey mud on ground defining a spreading area which is free from water and which is prepared to receive the mud by laying a filtering bottom above the level of ground water, said installation comprising a decanting tank, means for supplying to said tank a mixture of mud and flocculating agent for settling, a pipe leading from said decanting tank, a mud extraction pump within said pipe for extracting said settled mixture of mud and flocculating agent from the decanting tank and to convey said mixture up to at least one high mud pouring point located above said prepared ground, said installation further comprising means connected to said pipe just upstream of said at least one high mud pouring point for adding extra flocculating agent to said mixture to effect superflocculation of the extracted mud just prior to spreading over the spreading area, said spreading area lying between at least one upstream embankment and one downstream embankment, the upsteam embankment constituting said high pouring point and said spreading area further being slightly inclined downwardly and away from said upper embankment in a direction towards said downstream embankment.

2. An installation according to claim 1, wherein said extra flocculating agent adding means comprises means for adding said agent to said pipe at two adding points spaced a few meters apart and including means for injecting the flocculating agent into said pipe at a first, more upstream, adding point after being diluted with part of the water drained off from the spread mud, and means for injecting additional flocculating agent into said pipe at a second, more downstream point.

3. An installation according to claim 2, wherein said pipe is provided with a plurality of successive discharge points.

4. A method of spreading clayey mud and reclaiming land, the method comprising the steps of:
   preparing an area of land to receive the mud, said preparation step including surrounding said area with mud-retaining embankments,
   ensuring the area is dry and above the level of ground water and
   covering the area with a filtering layer of sand;
   preparing a mixture of muddy water and flocculating agent;
   conveying said mixture to at least one high pouring point, and
   pouring said mixture onto the prepared area; and
   adding additional flocculating agent to said mixture in the vicinity of said high pouring point.

* * * * *